US012698190B2

(12) United States Patent
Chen et al.

(10) Patent No.: US 12,698,190 B2
(45) Date of Patent: Aug. 4, 2026

(54) INTELLIGENT LOGISTICS SYSTEM FOR WHEELS

(71) Applicant: FORMOSA HEAVY INDUSTRIES CORPORATION, Kaohsiung City (TW)

(72) Inventors: Tsung-Jen Chen, Kaohsiung City (TW); Chin-Shui Hsu, Kaohsiung City (TW)

(73) Assignee: FORMOSA HEAVY INDUSTRIES CORPORATION, Kaohsiung City (TW)

( * ) Notice: Subject to any disclaimer, the term of this patent is extended or adjusted under 35 U.S.C. 154(b) by 517 days.

(21) Appl. No.: 18/349,435

(22) Filed: Jul. 10, 2023

(65) Prior Publication Data

US 2024/0092618 A1     Mar. 21, 2024

(30) Foreign Application Priority Data

Sep. 19, 2022    (TW)  ................................. 111210186

(51) Int. Cl.
    B65G 1/06       (2006.01)
    B66F 9/07       (2006.01)
    B66F 9/12       (2006.01)

(52) U.S. Cl.
    CPC .................. B66F 9/07 (2013.01); B65G 1/06 (2013.01); B66F 9/12 (2013.01)

(58) Field of Classification Search
    CPC ..... B66F 9/07; B66F 9/12; B65G 1/02; B65G 1/06; B65G 1/0407; Y02P 90/02
    See application file for complete search history.

(56) References Cited

U.S. PATENT DOCUMENTS

| | | | | |
|---|---|---|---|---|
| 3,696,949 A | * | 10/1972 | Leblond | B65G 1/0407 |
| | | | | 414/331.11 |
| 9,466,047 B1 | * | 10/2016 | Allen | A47F 7/04 |
| 9,710,783 B1 | * | 7/2017 | Allen | B65G 1/02 |
| 9,828,224 B1 | * | 11/2017 | Hamilton | B66F 9/12 |
| 2012/0027558 A1 | * | 2/2012 | Weeden | B65G 1/02 |
| | | | | 211/23 |
| 2016/0122078 A1 | * | 5/2016 | Clark | B65D 19/44 |
| | | | | 108/55.3 |
| 2019/0367274 A1 | * | 12/2019 | Aparecido Castilho | |
| | | | | B65G 1/08 |
| 2021/0362952 A1 | * | 11/2021 | Matikainen | B65G 1/0407 |

* cited by examiner

*Primary Examiner* — Saul Rodriguez
*Assistant Examiner* — Ashley K Romano
(74) *Attorney, Agent, or Firm* — MUNCY, GEISSLER, OLDS & LOWE, P.C.

(57)            ABSTRACT

An intelligent logistics system for wheels is configured to access a first rim and a second rim, and includes a conveyor belt, a material rack and a moving member. The material rack includes a plurality of placement assemblies. Two of the placement assemblies are configured to place the first rim and the second rim. The moving member reciprocates between the conveyor belt and the material rack, and includes two drivers, a moving frame driven by one of the two drivers and two moving carriers driven by another of the two drivers. The two moving carriers respectively load the first rim and the second rim from the conveyor belt. The two moving carriers respectively limit the first rim and the second rim, and the two moving carriers unload the first rim and the second rim to the two of the placement assemblies of the material rack.

17 Claims, 7 Drawing Sheets

100

400

420

Y

432

434

414

412

X

INTELLIGENT LOGISTICS SYSTEM FOR WHEELS

RELATED APPLICATIONS

This application claims priority to Taiwan Application Serial Number 111210186, filed Sep. 19, 2022, which is herein incorporated by reference.

BACKGROUND

Technical Field

The present disclosure relates to an intelligent logistics system. More particularly, the present disclosure relates to an intelligent logistics system for wheels.

Description of Related Art

In a general logistics system, there must be a warehouse between the processes to adjust the processing schedule. The conventional warehouse has a large number of pallets, which require manual selection of the batch number, stacking or unstacking. However, the conventional warehouse takes time to find materials, and the error rate is high. The conventional warehouse needs to rely on a large number of forklifts to operate, which has potential safety hazards and cannot automate the entire process. In addition, if automatic robotic arms are used instead of manual operation to warehouse with the pallets, a large number of robotic arms are needed to be used for stacking/unstacking in the production line configuration, although manpower and safety hazards can be reduced. Furthermore, if the batches are mixed during the production process, additional stacking/unstacking area must be set up for sifting when the rims of the same batch number are to be stacked. Moreover, the supply and recovery of partition plates must be considered again, thus making automation difficult. Therefore, an intelligent logistics system for wheels which is capable of automating the entire process and realizing the automatic storage of the rims of different sizes without using a conventional loader is commercially desirable.

SUMMARY

According to one aspect of the present disclosure, an intelligent logistics system for wheels is configured to access a first rim and a second rim, and includes a conveyor belt, a material rack and a moving member. The conveyor belt is configured to convey the first rim and the second rim. The material rack includes a plurality of placement assemblies. Two of the placement assemblies are configured to place the first rim and the second rim. The moving member reciprocates between the conveyor belt and the material rack. The moving member includes two drivers, a moving frame and two moving carriers. The moving frame is driven by one of the two drivers. The two moving carriers are disposed on the moving frame and driven by another of the two drivers. The two moving carriers respectively load the first rim and the second rim from the conveyor belt. The two moving carriers respectively limit the first rim and the second rim, and the two moving carriers unload the first rim and the second rim to the two of the placement assemblies of the material rack.

According to another aspect of the present disclosure, an intelligent logistics system for wheels is configured to access a first rim and a second rim, and includes a conveyor belt, a material rack and a moving member. The conveyor belt is configured to convey the first rim and the second rim. The material rack includes a plurality of placement assemblies. Two of the placement assemblies are configured to place the first rim and the second rim, and each of the placement assemblies includes two placement plates which are corresponding to each other and separated by a gap distance. The moving member reciprocates between the conveyor belt and the material rack. The moving member includes two moving carriers. The two moving carriers respectively load the first rim and the second rim from the conveyor belt. The two moving carriers respectively limit the first rim and the second rim. The two moving carriers unload the first rim and the second rim to the two of the placement assemblies of the material rack. Each of the two moving carriers has a carrier width, and the carrier width is smaller than the gap distance.

According to further another aspect of the present disclosure, an intelligent logistics system for wheels is configured to access a first rim and a second rim, and includes a carrier rack, a material rack and a moving member. The carrier rack is configured to carry the first rim and the second rim. The material rack includes a plurality of placement assemblies. Two of the placement assemblies are configured to place the first rim and the second rim. The moving member reciprocates between the carrier rack and the material rack. The moving member includes two drivers, a moving frame and two moving carriers. The moving frame is driven by one of the two drivers. The two moving carriers are disposed on the moving frame and driven by another of the two drivers. The two moving carriers respectively load the first rim and the second rim from the carrier rack. The two moving carriers respectively limit the first rim and the second rim, and the two moving carriers unload the first rim and the second rim to the two of the placement assemblies of the material rack.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device, module) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
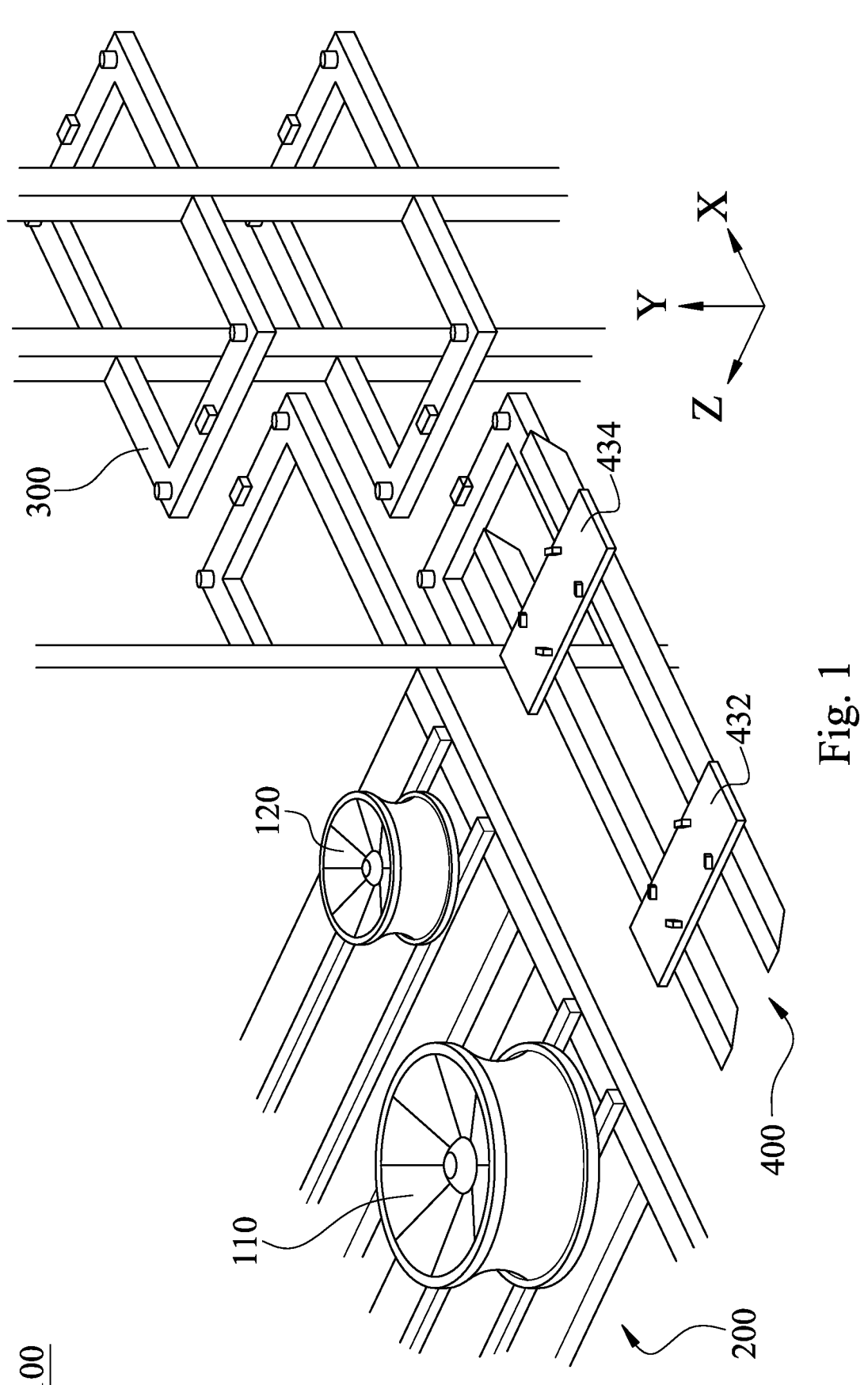
FIG. 1 shows a schematic view of an intelligent logistics system for wheels according to a first embodiment of the present disclosure.
Figure 2:
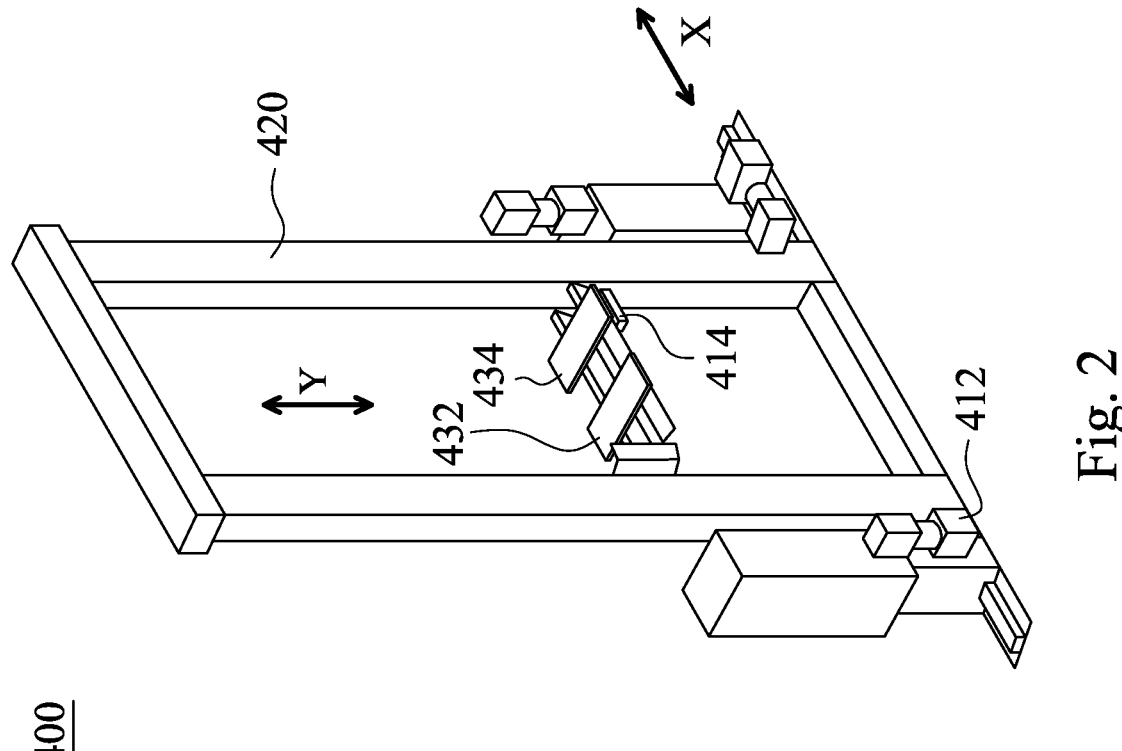
FIG. 2 shows a schematic view of a moving member of the intelligent logistics system for the wheels of FIG. 1.

Reference is made to FIGS. 1 and 2. FIG. 1 shows a schematic view of an intelligent logistics system 100 for wheels according to a first embodiment of the present disclosure. FIG. 2 shows a schematic view of a moving member 400 of the intelligent logistics system 100 for the wheels of FIG. 1. The intelligent logistics system 100 for the wheels is configured to access a first rim 110 and a second rim 120, and includes a conveyor belt 200, a material rack 300 and a moving member 400 (two sets of forks). The conveyor belt 200 is configured to convey the first rim 110 and the second rim 120. The material rack 300 includes a plurality of placement assemblies. Two of the placement assemblies are configured to place the first rim 110 and the second rim 120. The moving member 400 reciprocates between the conveyor belt 200 and the material rack 300. The moving member 400 includes two drivers 412, 414, a moving frame 420 and two moving carriers 432, 434. The moving frame 420 is driven by one (i.e., the driver 412) of the two drivers 412, 414. The two moving carriers 432, 434 are disposed on the moving frame 420 and driven by another (i.e., the driver 414) of the two drivers 412, 414. The two moving carriers 432, 434 respectively load the first rim 110 and the second rim 120 from the conveyor belt 200. The two moving carriers 432, 434 respectively limit the first rim 110 and the second rim 120, and the two moving carriers 432, 434 unload the first rim 110 and the second rim 120 to the two of the placement assemblies of the material rack 300. Therefore, the intelligent logistics system 100 for the wheels of the present disclosure transfers the rims from the conveyor belt 200 to the material rack 300 via the moving member 400, thereby realizing the automatic storage of the rims of different sizes without using a conventional loader (such as a pallet) to solve the problem that conventional warehousing requires manual stacking/unstacking by using the conventional loader and cannot automate the entire process.

Figure 3:
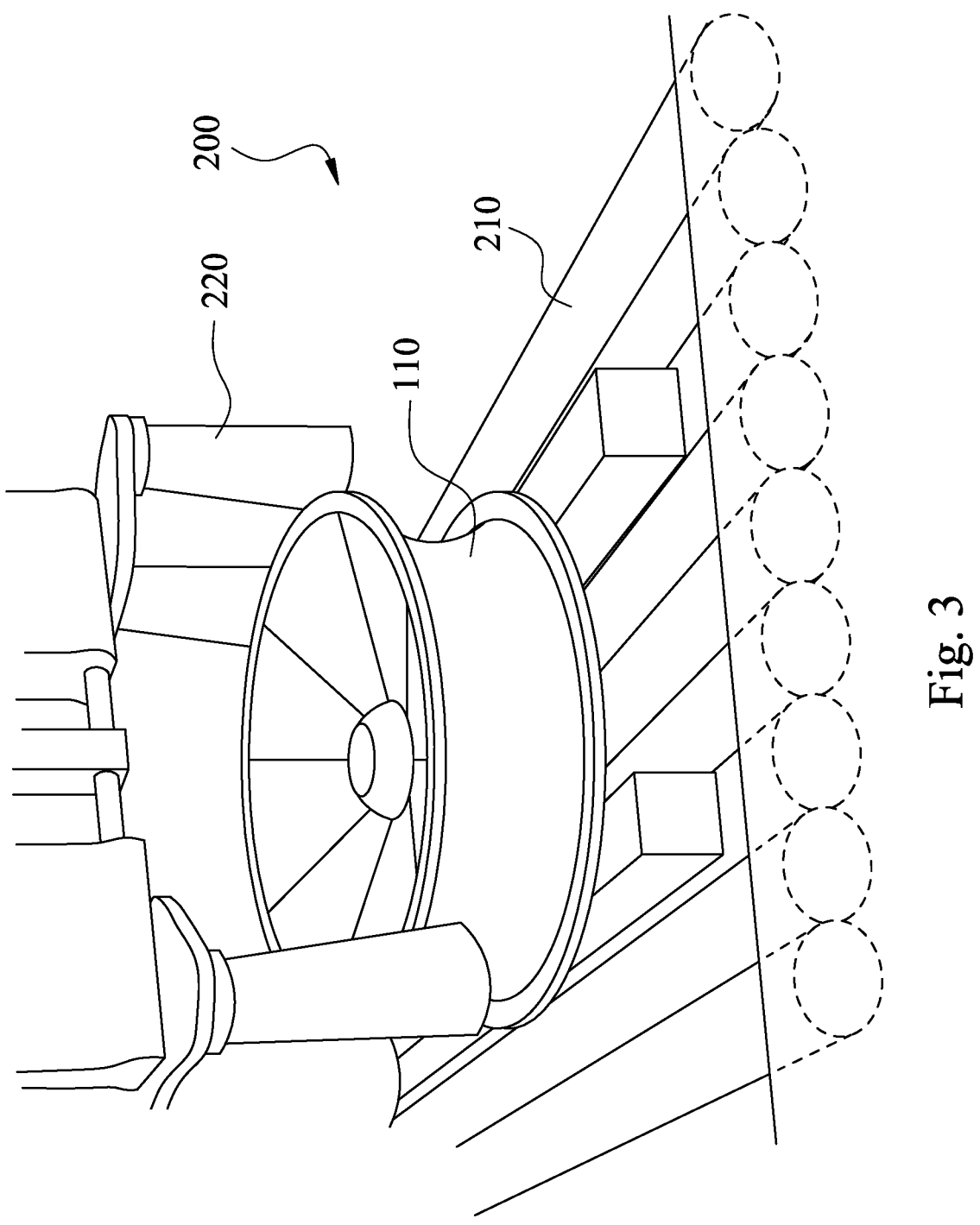
FIG. 3 shows a schematic view of a conveyor belt of the intelligent logistics system for the wheels of FIG. 1.

Reference is made to FIGS. 1, 2 and 3. FIG. 3 shows a schematic view of a conveyor belt 200 of the intelligent logistics system 100 for the wheels of FIG. 1. The conveyor belt 200 includes a conveyor track 210 and a central positioning device 220. The conveyor track 210 is configured to carry one (e.g., the first rim 110) of the first rim 110 and the second rim 120. The conveyor track 210 has a central location. The central positioning device 220 is located at one end of the conveyor track 210 and configured to position the one of the first rim 110 and the second rim 120 to the central position. Therefore, the present disclosure can position the rim at a center of the conveyor track 210 via the central positioning device 220, thus not only preventing deviation, but also facilitating loading and unloading of the two moving carriers 432, 434 of the moving member 400.

Figure 4:
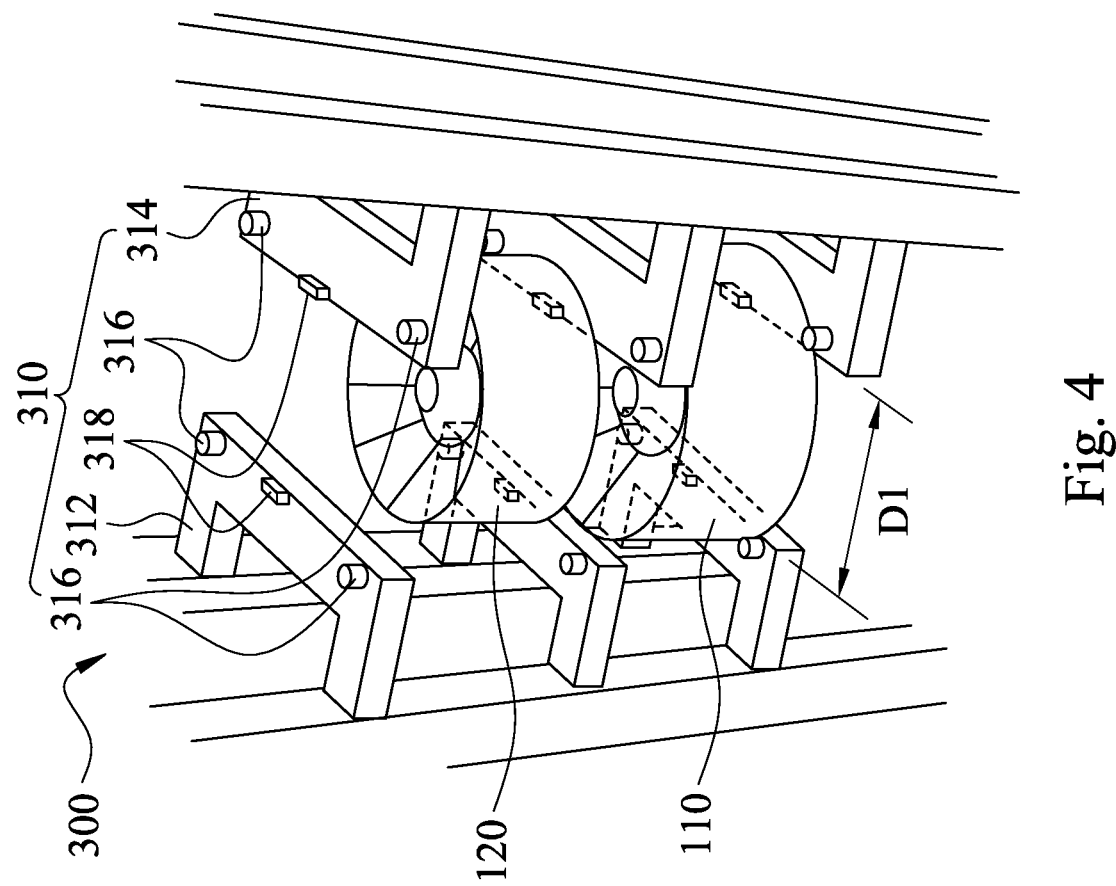
FIG. 4 shows a schematic view of a material rack of the intelligent logistics system for the wheels of FIG. 1.

Reference is made to FIGS. 1, 2, 3 and 4. FIG. 4 shows a schematic view of a material rack 300 of the intelligent logistics system 100 for the wheels of FIG. 1. Each of the placement assemblies 310 of the material rack 300 includes two placement plates 312, 314, a plurality of first placement blocks 316 and two second placement blocks 318. The two placement plates 312, 314 are corresponding to each other and separated by a gap distance D1. The two placement plates 312, 314 are configured to place any one of the first rim 110 and the second rim 120. The first rim 110 and the second rim 120 have a first size and a second size, respectively, and the first size and the second size are different from each other. In other words, the first size is a diameter of the first rim 110, and the second size is a diameter of the second rim 120. The gap distance D1 is smaller than a smaller one of the first size and the second size. In one embodiment, the first size is larger than the second size, and the first size and the second size are 25 inches and 17 inches, respectively, but the present disclosure is not limited thereto. In addition, the first placement blocks 316 are configured to limit the first rim 110. One part of the first placement blocks 316 is disposed on one of the two placement plates 312, 314, and another part of the first placement blocks 316 is disposed on another of the two placement plates 312, 314. A position of the one part of the first placement blocks corresponds to a position of the another part of the first placement blocks. In the embodiment, the number of the first placement blocks 316 is four. Two of the first placement blocks 316 are disposed on the placement plate 312, and the other two of the first placement blocks 316 are disposed on the placement plate 314. Moreover, the two second placement blocks 318 are configured to limit the second rim 120. One of the two second placement blocks 318 is disposed on the placement plate 312, and another of the two second placement blocks 318 is disposed on the placement plate 314. A position of the one of the two second placement blocks 318 corresponds to a position of another of the two second placement blocks 318.

Figure 5:
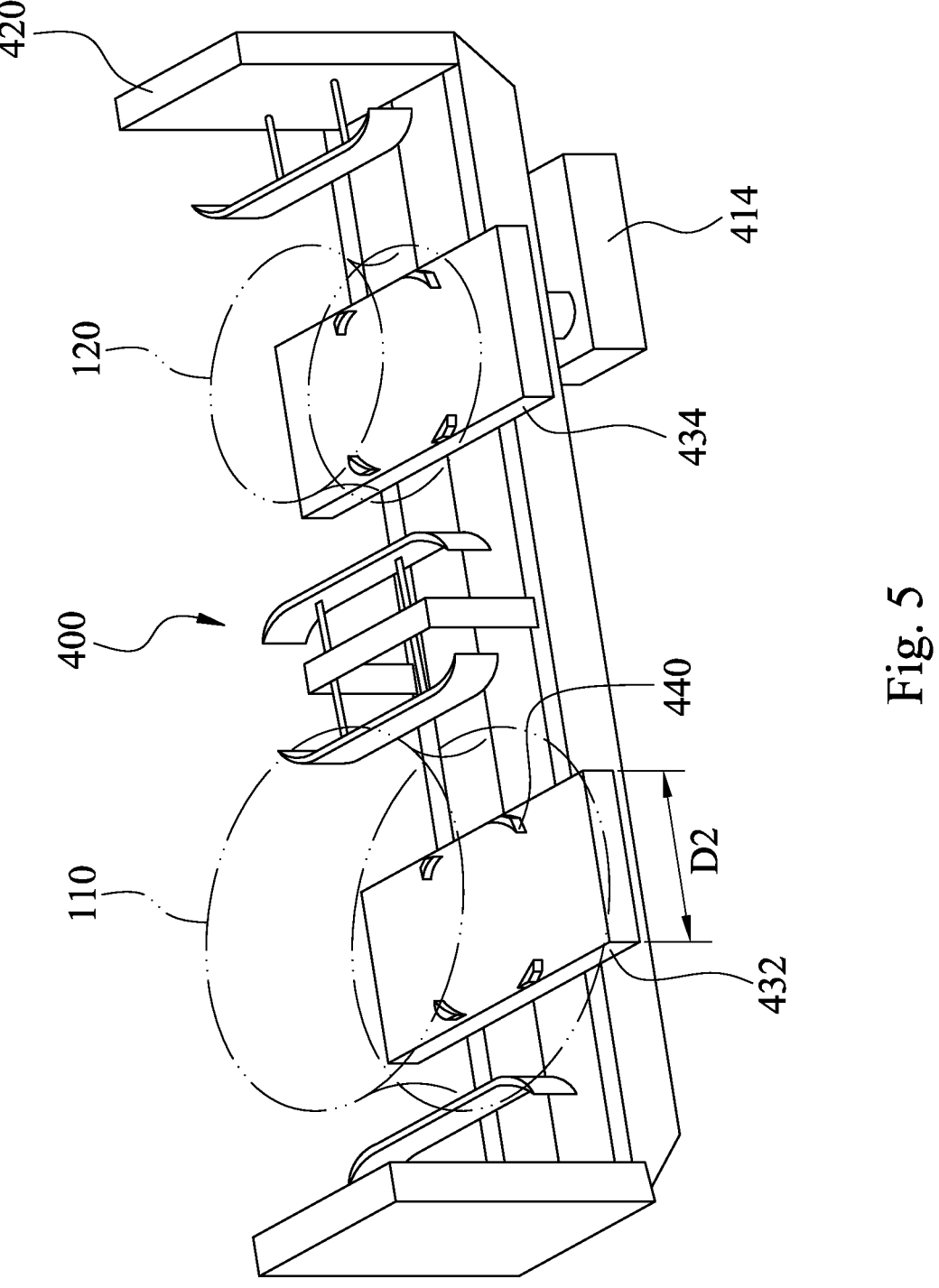
FIG. 5 shows a schematic view of two moving carriers of the intelligent logistics system for the wheels of FIG. 1.

Reference is made to FIGS. 1, 2, 4 and 5. FIG. 5 shows a schematic view of two moving carriers 432, 434 of the intelligent logistics system 100 for the wheels of FIG. 1. The moving member 400 includes a driver 414, a moving frame 420, the two moving carriers 432, 434 and a plurality of carrier stoppers 440. The carrier stoppers 440 are disposed on each of the two moving carriers 432, 434. There is a stopper distance between two (i.e., the two carrier stoppers 440 at the opposite corners) of the carrier stoppers 440, and the stopper distance is smaller than the second size of the second rim 120. In other words, when the first rim 110 or the second rim 120 is loaded on the two moving carriers 432, 434, the carrier stoppers 440 are located in one or more holes of the first rim 110 or the second rim 120. In the embodiment, the number of the carrier stoppers 440 is four, but the present disclosure is not limited thereto. In addition, each of the two moving carriers 432, 434 has a carrier width D2, and the carrier width D2 is smaller than the gap distance D1 (i.e., the distance between the two placement plates 312, 314).

Figure 6:
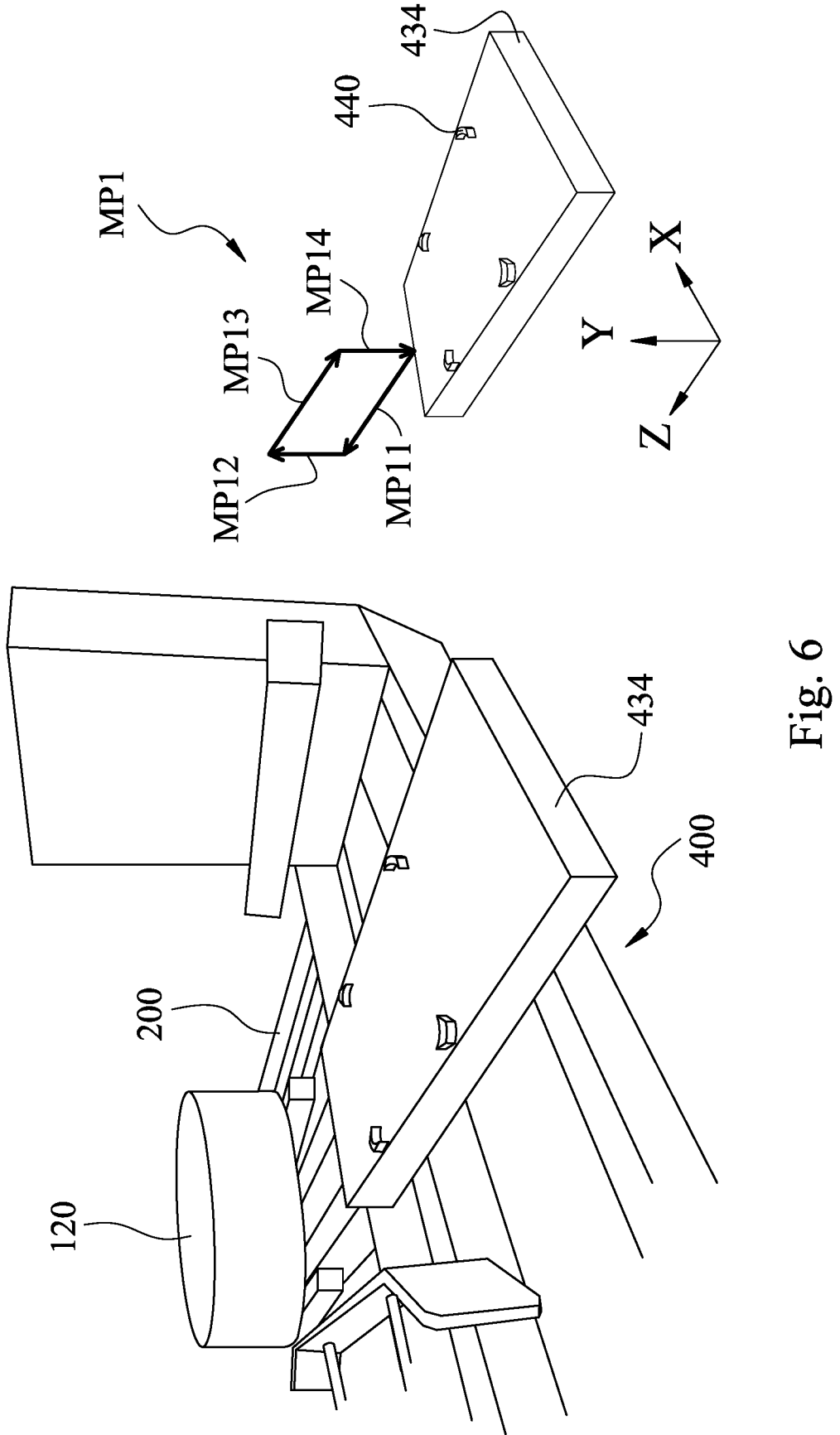
FIG. 6 shows a schematic view of a loading movement path of one of the two moving carriers of FIG. 5.

Reference is made to FIGS. 1, 2, 5 and 6. FIG. 6 shows a schematic view of a loading movement path MP1 of one (i.e., the moving carrier 434) of the two moving carriers 432, 434 of FIG. 5. When the moving carrier 434 of the moving member 400 loads the second rim 120 from the conveyor belt 200, it can be realized via the loading movement path MP1. In detail, the moving frame 420 is driven by the one (e.g., the driver 412) of the two drivers 412, 414 to move in a first direction X or a second direction Y, and the first direction X and the second direction Y are perpendicular to each other. One of the two moving carriers 432, 434 is driven by the another (e.g., the driver 414) of the two drivers 412, 414 to move in a third direction Z, and the first direction X, the second direction Y and the third direction Z are perpendicular to each other. The driver 414 drives the moving carrier 434 to move according to the loading movement path MP1, so that one (e.g., the second rim 120) of the first rim 110 and the second rim 120 is loaded. The loading movement path MP1 includes a horizontal moving-in path MP11, a vertical upward path MP12, a horizontal moving-out path MP13 and a vertical downward path MP14. The horizontal moving-in path MP11 and the horizontal moving-out path MP13 are both parallel to the third direction Z, and the vertical upward path MP12 and the vertical downward path MP14 are both parallel to the second direction Y. In the embodiment, the second rim 120 is originally located on two load bars above the conveyor belt 200, and the moving carrier 434 is originally located beside the conveyor belt 200. It can be known from the loading movement path MP1 that the moving carrier 434 is horizontally moved into a space between the conveyor belt 200 and the second rim 120 at a first height according to the horizontal moving-in path MP11. When the moving carrier 434 completes the motion of the horizontal moving-in path MP11, the moving carrier 434 and the carrier stoppers 440 are located below the second rim 120. Then, the moving carrier 434 is moved upward to a second height according to the vertical upward path MP12. At this moment, the second rim 120 is lifted by the moving carrier 434 to leave from the two load bars above the conveyor belt 200. Thereafter, the second rim 120 is horizontally moved out to the moving frame 420 by the moving carrier 434 according to the horizontal moving-out path MP13 and the vertical downward path MP14. The second height is greater than the first height. Therefore, the two moving carriers 432, 434 of the moving member 400 of the present disclosure can realize the automatic loading of the rim (wheel) via the loading movement path MP1. In other embodiments, the moving frame 420 can be driven by two different drivers (e.g., an X-axis driver and a Y-axis driver) to move along the first direction X and the second direction Y, respectively. In addition, the two moving carriers 432, 434 can be driven by two different drivers (e.g., two drivers 414) to move along the third direction Z.

Figure 7:
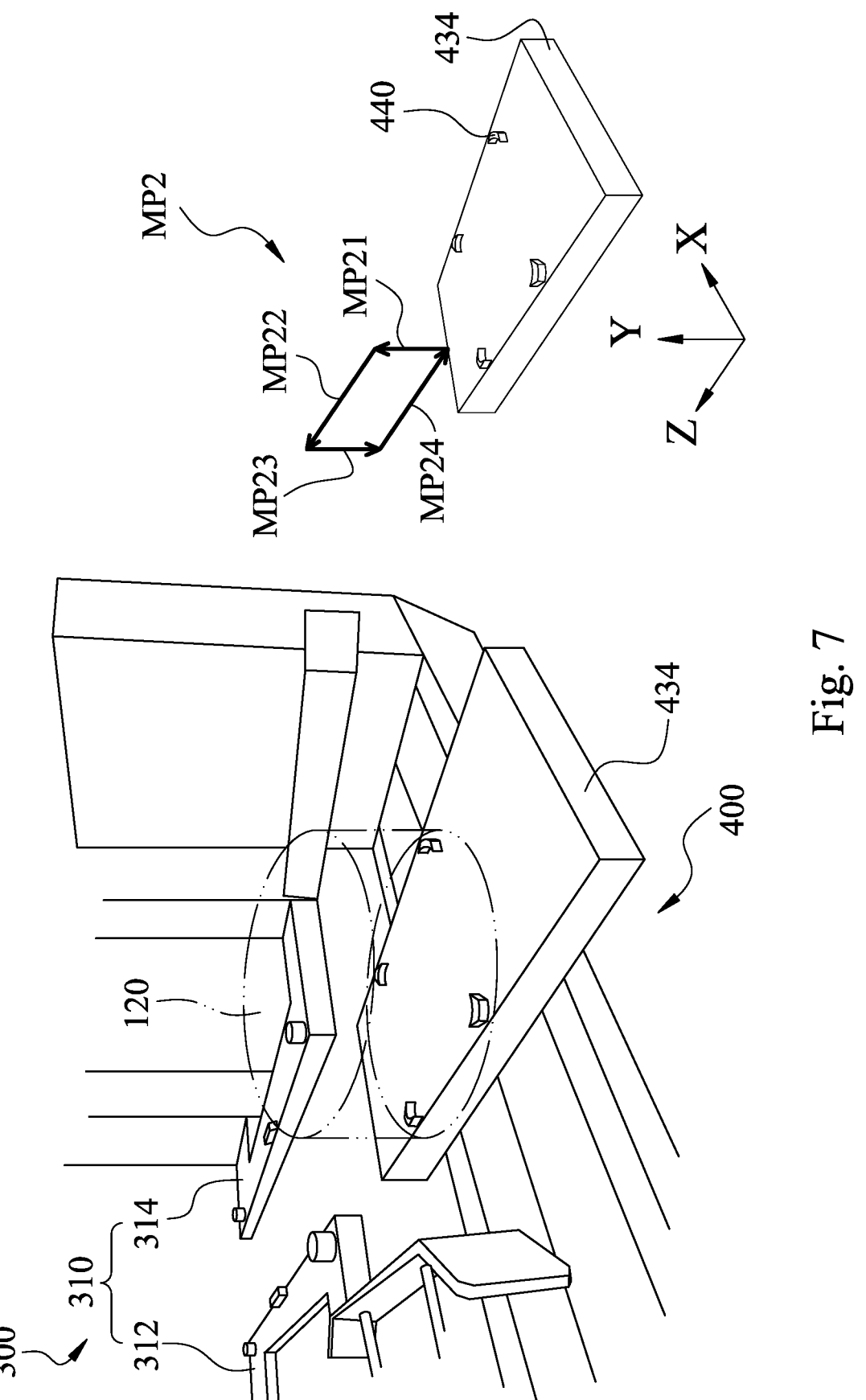
FIG. 7 shows a schematic view of an unloading movement path of the one of the two moving carriers of FIG. 5.

Reference is made to FIGS. 1, 2, 5 and 7. FIG. 7 shows a schematic view of an unloading movement path MP2 of the one (i.e., the moving carrier 434) of the two moving carriers 432, 434 of FIG. 5. When the moving carrier 434 of the moving member 400 unloads the second rim 120 to the placement assembly 310 of the material rack 300, it can be realized via the unloading movement path MP2. In detail, the driver 414 drives the moving carrier 434 to move according to the unloading movement path MP2, so that one (e.g., the second rim 120) of the first rim 110 and the second rim 120 is unloaded. The unloading movement path MP2 includes a vertical upward path MP21, a horizontal moving-in path MP22, a vertical downward path MP23 and a horizontal moving-out path MP24. The horizontal moving-in path MP22 and the horizontal moving-out path MP24 are both parallel to the third direction Z, and the vertical upward path MP21 and the vertical downward path MP23 are both parallel to the second direction Y. In the embodiment, the second rim 120 is originally located on the moving carrier 434, and the moving carrier 434 is originally located beside the material rack 300. It can be known from the unloading movement path MP2 that the moving carrier 434 is horizontally moved to the top of the placement assembly 310 at a third height according to the vertical upward path MP21 and the horizontal moving-in path MP22. When the moving carrier 434 completes the motion of the horizontal moving-in path MP22, the two second placement blocks 318 are located below the second rim 120. Then, the moving carrier

434 is moved downward to a fourth height according to the vertical downward path MP23. During the downward moving process, the moving carrier 434 passes through a gap between the two placement plates 312, 314, and the second rim 120 is unloaded from the moving carrier 434 to the two placement plates 312, 314. Thereafter, the moving carrier 434 is horizontally moved out to the moving frame 420 according to the horizontal moving-out path MP24. The third height is greater than the fourth height. Therefore, the two moving carriers 432, 434 of the moving member 400 of the present disclosure can realize the automatic unloading of the rim (wheel) via the unloading movement path MP2.

It is worth mentioning that the aforementioned moving member 400 has a moving speed and a handling capacity of loading and unloading. The moving speed can be greater than or equal to 300 meters/minute and less than or equal to 400 meters/minute. The handling capacity of loading and unloading can be greater than or equal to 100 times/hour and less than or equal to 150 times/hour, but the present disclosure is not limited thereto. In addition, the moving member 400 can move the rim to any desired storage position via the three-dimensional movement of the two moving carriers 432, 434 combined with the moving frame 420. Moreover, after the first rim 110 and the second rim 120 are loaded on the two moving carriers 432, 434, the first rim 110 and the second rim 120 can be unloaded in sequence. In other words, the moving member 400 can load two rims from the conveyor belt 200 at the same time, and after the two rims are unloaded to the material rack 300 in sequence, the moving member 400 can go back to the conveyor belt 200 to load another two rims. Accordingly, the present disclosure can utilize cyclic transport to greatly increase the carrying capacity and the handling capacity of loading and unloading, thereby improving the efficiency of logistics management.

In other embodiment, an intelligent logistics system for wheels can include a carrier rack configured to carry the first rim 110 and the second rim 120 instead of the conveyor belt 200. The carrier rack may include a plurality of load bars. The first rim 110 can be disposed on two of the load bars, and the second rim 120 can be disposed on another two of the load bars.

According to the aforementioned embodiments and examples, the advantages of the present disclosure are described as follows.

1. The intelligent logistics system for the wheels of the present disclosure transfers the rims from the conveyor belt to the material rack via the moving member, thereby realizing the automatic storage of the rims of different sizes without using a conventional loader to solve the problem that conventional warehousing requires manual stacking/unstacking by using the conventional loader and cannot automate the entire process.

2. The intelligent logistics system for the wheels of the present disclosure can position the rim at a center of the conveyor track via the central positioning device, thus not only preventing deviation, but also facilitating loading and unloading of the two moving carriers of the moving member.

3. The intelligent logistics system for the wheels of the present disclosure can utilize the moving member with special structure to load the rims of different sizes at one time to greatly increase the carrying capacity and the handling capacity of loading and unloading, thereby improving the efficiency of logistics management.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An intelligent logistics system for wheels, which is configured to access a first rim and a second rim, and the intelligent logistics system for the wheels comprising:

a conveyor belt configured to convey the first rim and the second rim;

a material rack comprising a plurality of placement assemblies, wherein two of the placement assemblies are configured to place the first rim and the second rim; and a moving member reciprocating between the conveyor belt and the material rack, wherein the moving member comprises:

two drivers;

a moving frame driven by one of the two drivers; and two moving carriers disposed on the moving frame and driven by another of the two drivers, wherein the two moving carriers respectively load the first rim and the second rim from the conveyor belt, the two moving carriers respectively limit the first rim and the second rim, and the two moving carriers unload the first rim and the second rim to the two of the placement assemblies of the material rack;

wherein each of the placement assemblies of the material rack comprises:

two placement plates corresponding to each other and separated by a gap distance;

each of the two moving carriers has a carrier width, and the carrier width is smaller than the gap distance; and each of the placement assemblies of the material rack further comprises:

a plurality of first placement blocks configured to limit the first rim, wherein one part of the first placement blocks is disposed on one of the two placement plates, another part of the first placement blocks is disposed on another of the two placement plates, and a position of the one part of the first placement blocks corresponds to a position of the another part of the first placement blocks.

2. The intelligent logistics system for the wheels of claim 1, wherein the first rim and the second rim have a first size and a second size, respectively, and the first size and the second size are different from each other.

3. The intelligent logistics system for the wheels of claim 1, wherein each of the placement assemblies of the material rack further comprises:

two second placement blocks configured to limit the second rim, wherein one of the two second placement blocks is disposed on the one of the two placement plates, another of the two second placement blocks is disposed on the another of the two placement plates, and a position of the one of the two second placement blocks corresponds to a position of the another of the two second placement blocks.

4. The intelligent logistics system for the wheels of claim 2, wherein the first size is larger than the second size, and the moving member further comprises:

a plurality of carrier stoppers disposed on each of the two moving carriers, wherein there is a stopper distance between two of the carrier stoppers, and the stopper distance is smaller than the second size.

5. The intelligent logistics system for the wheels of claim 1, wherein the conveyor belt comprises:

a conveyor track configured to carry one of the first rim and the second rim, wherein the conveyor track has a central location; and a central positioning device located at one end of the conveyor track and configured to position the one of the first rim and the second rim to the central location.

6. The intelligent logistics system for the wheels of claim 1, wherein, the moving frame is driven by the one of the two drivers to move in a first direction or a second direction, and the first direction and the second direction are perpendicular to each other; and one of the two moving carriers is driven by the another of the two drivers to move in a third direction, and the first direction, the second direction and the third direction are perpendicular to each other.

7. The intelligent logistics system for the wheels of claim 6, wherein the another of the two drivers drives the one of the two moving carriers to move according to a loading movement path, so that one of the first rim and the second rim is loaded, the loading movement path comprises a horizontal moving-in path, a vertical upward path and a horizontal moving-out path, the horizontal moving-in path and the horizontal moving-out path are both parallel to the third direction, and the vertical upward path is parallel to the second direction.

8. The intelligent logistics system for the wheels of claim 6, wherein the another of the two drivers drives the one of the two moving carriers to move according to an unloading movement path, so that one of the first rim and the second rim is unloaded, the unloading movement path comprises a horizontal moving-in path, a vertical downward path and a horizontal moving-out path, the horizontal moving-in path and the horizontal moving-out path are both parallel to the third direction, and the vertical downward path is parallel to the second direction.

9. An intelligent logistics system for wheels, which is configured to access a first rim and a second rim, and the intelligent logistics system for the wheels comprising:

a conveyor belt configured to convey the first rim and the second rim;

a material rack comprising a plurality of placement assemblies, wherein two of the placement assemblies are configured to place the first rim and the second rim, and each of the placement assemblies comprises two placement plates which are corresponding to each other and separated by a gap distance; and a moving member reciprocating between the conveyor belt and the material rack, wherein the moving member comprises:

two moving carriers respectively loading the first rim and the second rim from the conveyor belt, wherein the two moving carriers respectively limit the first rim and the second rim, the two moving carriers unload the first rim and the second rim to the two of the placement assemblies of the material rack, each of the two moving carriers has a carrier width, and the carrier width is smaller than the gap distance;

wherein each of the placement assemblies of the material rack further comprises:

a plurality of first placement blocks configured to limit the first rim, wherein one part of the first placement blocks is disposed on one of the two placement plates, another part of the first placement blocks is disposed on another of the two placement plates, and a position of the one part of the first placement blocks corresponds to a position of the another part of the first placement blocks.

10. The intelligent logistics system for the wheels of claim 9, wherein the first rim and the second rim have a first size and a second size, respectively, and the first size and the second size are different from each other.

11. The intelligent logistics system for the wheels of claim 10, wherein the first size is larger than the second size, and the moving member further comprises:

a plurality of carrier stoppers disposed on each of the two moving carriers, wherein there is a stopper distance between two of the carrier stoppers, and the stopper distance is smaller than the second size.

12. The intelligent logistics system for the wheels of claim 9, wherein each of the placement assemblies of the material rack further comprises:

two second placement blocks configured to limit the second rim, wherein one of the two second placement blocks is disposed on the one of the two placement plates, another of the two second placement blocks is disposed on the another of the two placement plates, and a position of the one of the two second placement blocks corresponds to a position of the another of the two second placement blocks.

13. The intelligent logistics system for the wheels of claim 9, wherein the conveyor belt comprises:

a conveyor track configured to carry one of the first rim and the second rim, wherein the conveyor track has a central location; and a central positioning device located at one end of the conveyor track and configured to position the one of first rim and the second rim to the central location.

14. The intelligent logistics system for the wheels of claim 9, wherein the moving member further comprises:

two drivers; and a moving frame driven by one of the two drivers to move in a first direction or a second direction, wherein the first direction and the second direction are perpendicular to each other;

wherein the two moving carriers are disposed on the moving frame and driven by another of the two drivers to move in a third direction, and the first direction, the second direction and the third direction are perpendicular to each other.

15. The intelligent logistics system for the wheels of claim 14, wherein the another of the two drivers drives the one of the two moving carriers to move according to a loading movement path, so that one of the first rim and the second rim is loaded, the loading movement path comprises a horizontal moving-in path, a vertical upward path and a horizontal moving-out path, the horizontal moving-in path and the horizontal moving-out path are both parallel to the third direction, and the vertical upward path is parallel to the second direction.

16. The intelligent logistics system for the wheels of claim 14, wherein the another of the two drivers drives the one of the two moving carriers to move according to an unloading movement path, so that one of the first rim and the second rim is unloaded, the unloading movement path comprises a horizontal moving-in path, a vertical downward path and a horizontal moving-out path, the horizontal moving-in path and the horizontal moving-out path are both parallel to the third direction, and the vertical downward path is parallel to the second direction.

17. An intelligent logistics system for wheels, which is configured to access a first rim and a second rim, and the intelligent logistics system for the wheels comprising:

a carrier rack configured to carry the first rim and the second rim;

a material rack comprising a plurality of placement assemblies, wherein two of the placement assemblies are configured to place the first rim and the second rim; and a moving member reciprocating between the carrier rack and the material rack, wherein the moving member comprises:

two drivers;

a moving frame driven by one of the two drivers; and two moving carriers disposed on the moving frame and driven by another of the two drivers, wherein the two moving carriers respectively load the first rim and the second rim from the carrier rack, the two moving carriers respectively limit the first rim and the second rim, and the two moving carriers unload the first rim and the second rim to the two of the placement assemblies of the material rack;

wherein each of the placement assemblies of the material rack comprises:

two placement plates corresponding to each other and separated by a gap distance;

each of the two moving carriers has a carrier width, and the carrier width is smaller than the gap distance; and each of the placement assemblies of the material rack further comprises:

a plurality of first placement blocks configured to limit the first rim, wherein one part of the first placement blocks is disposed on one of the two placement plates, another part of the first placement blocks is disposed on another of the two placement plates, and a position of the one part of the first placement blocks corresponds to a position of the another part of the first placement blocks.

* * * * *